(12) United States Patent
Oide

(10) Patent No.: US 7,100,373 B2
(45) Date of Patent: Sep. 5, 2006

(54) HYDRAULIC TOOL

(75) Inventor: Eisuke Oide, Yokohama (JP)

(73) Assignee: Kabushiki Kaisha Ogura, Kanagawa-ken (JP)

( * ) Notice: Subject to any disclaimer, the term of this patent is extended or adjusted under 35 U.S.C. 154(b) by 0 days.

(21) Appl. No.: 10/517,593

(22) PCT Filed: Jun. 6, 2003

(86) PCT No.: PCT/JP03/07217

§ 371 (c)(1),
(2), (4) Date: Dec. 13, 2004

(87) PCT Pub. No.: WO03/106086

PCT Pub. Date: Dec. 24, 2003

(65) Prior Publication Data

US 2005/0223886 A1    Oct. 13, 2005

(30) Foreign Application Priority Data

Jun. 14, 2002    (JP) .............................. 2002-174437

(51) Int. Cl.
*B23D 29/00*    (2006.01)
*B26D 5/08*    (2006.01)

(52) U.S. Cl. ......................................... 60/477; 30/228
(58) Field of Classification Search ................. 60/462, 60/477, 481, 482, 470; 91/224; 30/228; 72/407, 416

See application file for complete search history.

(56) References Cited

U.S. PATENT DOCUMENTS

| | | | | |
|---|---|---|---|---|
| 2,446,011 A | * | 7/1948 | Johnson et al. ................ | 30/228 |
| 3,819,153 A | * | 6/1974 | Hurst et al. .................... | 60/477 |
| 4,369,576 A | | 1/1983 | McVaugh | |
| 5,209,153 A | * | 5/1993 | Araki et al. ................... | 91/442 |
| 5,272,811 A | * | 12/1993 | Armand ....................... | 30/228 |
| D386,661 S | * | 11/1997 | Hirabayashi et al. ........... | D8/68 |
| 5,953,822 A | * | 9/1999 | Vogelsanger ................. | 30/228 |
| 6,108,867 A | | 8/2000 | Nagashima | |
| 6,457,243 B1 | * | 10/2002 | Kimura ....................... | 30/360 |

FOREIGN PATENT DOCUMENTS

| | | |
|---|---|---|
| JP | 01-295710 | 11/1989 |
| JP | 07-148610 | 6/1995 |
| JP | 07-241720 | 9/1995 |
| JP | 11-028683 | 2/1999 |
| JP | 2000-273967 | 10/2000 |

* cited by examiner

*Primary Examiner*—Igor Kershteyn
(74) *Attorney, Agent, or Firm*—Dickstein Shapiro Morin & Oshinsky LLP

(57) ABSTRACT

A hydraulic tool is provided with a spool valve 24 for changing the flow of a working fluid pressurized by a hydraulic power generating mechanism in a hydraulic circuit. The spool valve 24 is slidable in directions perpendicular to a piston rod 18. A cylindrical grip handle 34 to be operated by the operator's hand is extended parallel to the piston rod 18 on the outer surface of the main casing 5 so as to be turnable about its own axis. The spool valve 24 and the grip handle 34 are interlocked by a cam mechanism including members 29, 30 and 21. The spool valve 24 is moved axially by turning the grip handle 34 to control the flow direction of the working fluid.

4 Claims, 5 Drawing Sheets

HYDRAULIC TOOL

TECHNICAL FIELD

The present invention relates to a hydraulic tool including a working tool provided with cutting blades or prying jaws to be operated by a hydraulically operated piston and, more particularly, to an easy-to-operate hydraulic device.

BACKGROUND ART

There are situations where doors need to be pried open during rescue operations, such as when a door of an automobile cannot be normally opened due to deformation of the automotive body caused by a traffic accident, or a door of a building cannot be normally opened due to the deformation of the building caused by an earthquake or a fire. Usually, a portable, hydraulic cutting and expanding tool generally called Combi Tools are used to open such a stuck door.

The applicant of the present patent application developed a portable, hydraulic tool capable of being easily operated by an operator and made a patent application for an invention related to the portable, hydraulic tool in Jpn. Pat. App. No. 2000-273697 and JP 2002-78988 A. This previously proposed portable, hydraulic tool includes a hydraulic power generating mechanism for generating hydraulic power, an electric motor for driving the hydraulic power generating mechanism, and a cylinder actuator provided with a piston and a piston rod. Working fluid pressurized by the hydraulic power generating mechanism drives the cylinder actuator to operate a working tool for opening and closing operations by the piston rod to cut and pry open a door or the like.

The hydraulic tool has a hydraulic circuit including a fluid passage through which the working fluid is supplied to the cylinder actuator and the working fluid is returned to a working fluid tank. A spool valve is placed in the fluid passage to control the operation of the working tool. The spool valve is operated manually to change the moving direction of the piston rod. The invention related to the patent application operates the spool valve by operating a slide handle disposed near the grip of the electric motor.

Since the slide handle for operating the spool valve of the hydraulic tool is disposed near the grip, the operator of the hydraulic operating device is able to control the hydraulic tool by operating the slide handle by hand-gripping the grip.

However, when the hydraulic tool is large or when the hydraulic tool needs to be pressed against a door or the like during a prying operation, the hydraulic tool cannot be stably held by the single hand and it is difficult to press the tip of the working tool firmly against the door or the like.

Since a finger of the hand gripping the grip is placed on the slide handle, it is difficult to hold the hydraulic operating device firmly.

Since the slide handle needs to be operated to operate the spool valve, the grip cannot be turned relative to a main casing, the positional relation between the grip and the main casing is fixed, and hence the operability of the hydraulic tool is unsatisfactory.

The present invention has been made in view of those problems and it is therefore an object of the present invention to provide a hydraulic tool capable of being stably held and of efficiently achieving opening and closing operations and working with reliability even under a condition where the hydraulic tool needs to exert a strong force on an object.

DISCLOSURE OF THE INVENTION

The present invention provides a hydraulic tool including: an electric motor having a grip resembling a pistol grip; a main casing having a back end connected to the electric motor, and internally provided with a working fluid tank containing a working fluid, a hydraulic power generating mechanism driven by the electric motor to pressurize the working fluid contained in the working fluid tank, a cylinder actuator including a piston to be axially moved by the pressurized working fluid and a piston rod connected to the piston, a hydraulic circuit connecting the hydraulic power generating mechanism and the cylinder actuator and having a supply passage for carrying the working fluid into a front pressure chamber on the front side of the piston or a back pressure chamber on the back side of the piston and return passages for carrying the working fluid back into the working fluid tank, and a spool valve placed in the hydraulic circuit to set the hydraulic circuit in a state for supplying the working fluid into either of the front or the back pressure chamber; and a working tool connected to a front part of the main casing and capable of being operated by the sliding piston rod; wherein the spool valve is supported so as to be able to slide in directions perpendicular to the piston rod, a cylindrical grip handle to be gripped by one of operator's hands is attached to the outer surface of the main casing so as to extend parallel to the piston rod, the grip handle is capable of being turned about its own axis, and the spool valve and the grip handle are interlocked by a motion converting mechanism capable of converting a turning motion of the grip handle into a sliding motion of the spool valve.

When using the hydraulic tool of the present invention, the operator is able to grip the grip with one hand and to grip the grip handle with the other hand, and is able to operate the spool valve by turning the grip handle gripped by the hand. Therefore, the hydraulic tool can be stably held and the working tool is able to perform opening and closing operations with reliability even if the hydraulic tool needs to exert a strong force on an object.

The hydraulic tool of the present invention is characterized by the grip handle capable of turning about the axis of the spool valve.

Thus the hydraulic tool can be held in an optimum position for working.

BEST MODE FOR CARRYING OUT THE INVENTION

A hydraulic tool in a preferred embodiment according to the present invention will be described with reference to the accompanying drawings.

Figure 1:
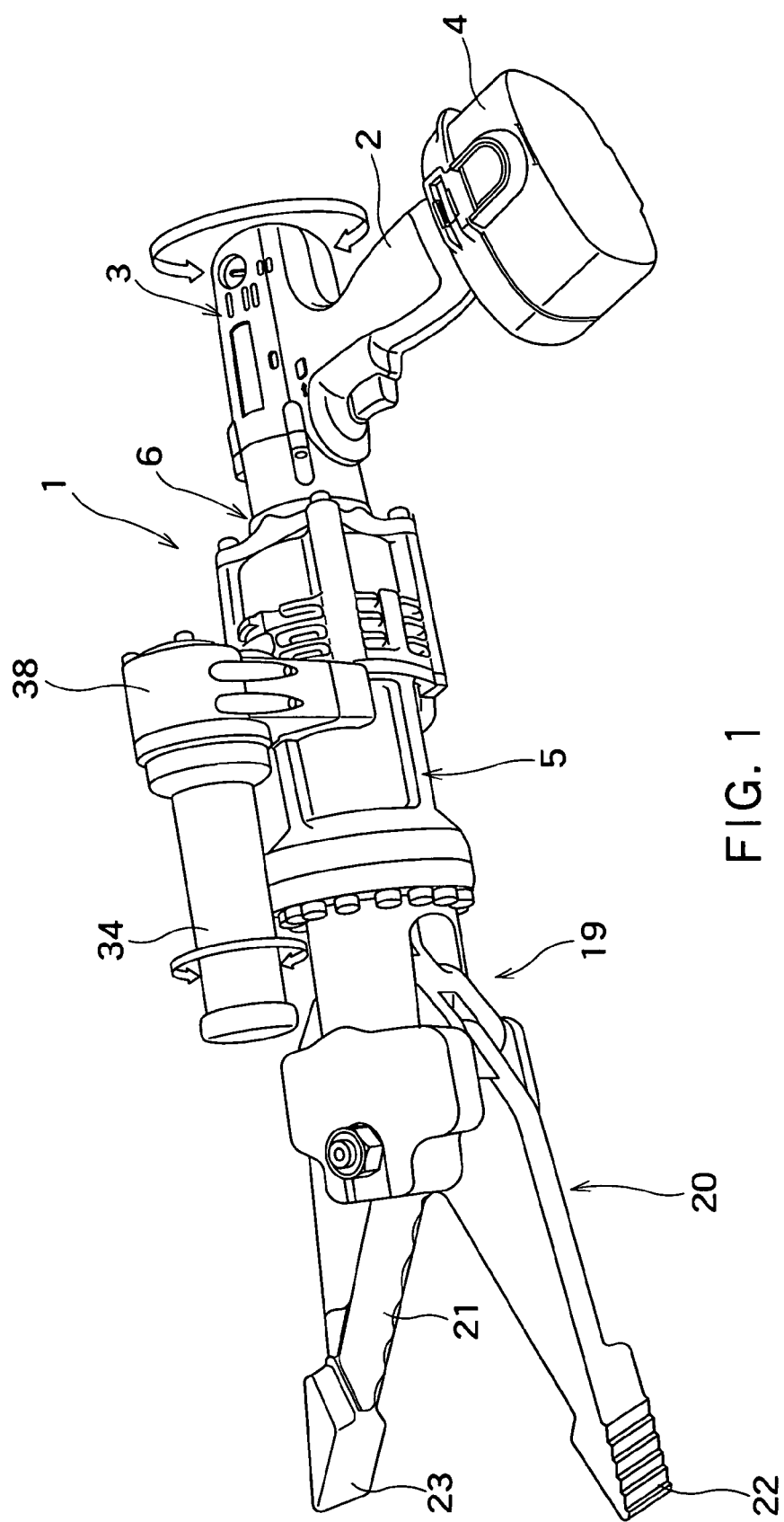
FIG. 1 is a perspective view of a hydraulic tool in a preferred embodiment according to the present invention.
Figure 2:
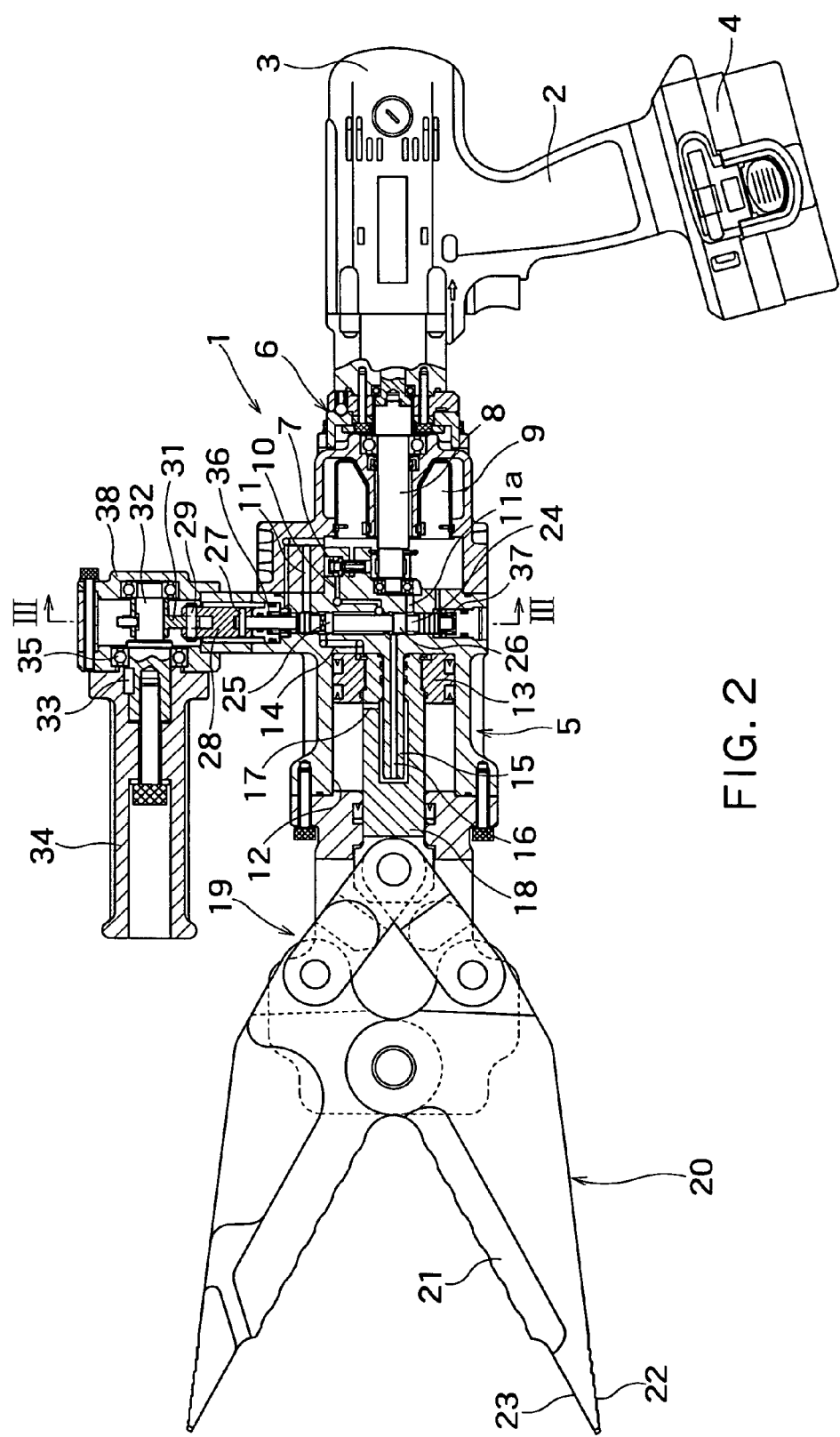
FIG. 2 is a cross-sectional view of the hydraulic tool in the preferred embodiment in a condition for prying work.

FIGS. 1 and 2 are a perspective view and a cross-sectional view, respectively, of a hydraulic tool 1 in a preferred embodiment according to the present invention. Referring to FIGS. 1 and 2, the hydraulic tool 1 includes an electric motor 3 having a grip 2 resembling a pistol grip, a main casing 5 connected by a rotary mechanism 6 to the electric motor 3 so as to be turnable, and a working tool 20 connected to a front part of the main casing 5 by a linkage 19.

A battery case 4 containing a battery, namely, a power source for the electric motor 3, is joined to the lower end of the grip 2 of the electric motor 3. A drive shaft 8 of the electric motor 3 is extended into the main casing 5 to drive a hydraulic power generating mechanism 7.

The hydraulic power generating mechanism 7 generates hydraulic power by using the working fluid contained in a working fluid tank 9 held in the main casing 5. The hydraulic power generating mechanism 7 is such a known mechanism as described in the specification and illustrated by the drawings for the previously mentioned patent application.

The rotary mechanism 6 has bearings supporting and connecting the electric motor 3 and the main casing 5. The rotary mechanism 6 permits the operator to turn the grip 2 of the electric motor 3 relative to the main casing 5 to hold the grip 2 in an optimum position.

A cylinder 12 is formed on the opposite side of the working fluid tank 9 in the main casing 5. A piston 13 is fitted axially slidably in the cylinder 12 and a piston rod 18 is connected to the piston 13. The piston rod 18 is guided for sliding by a piston guide 15 axially extended in the main casing 5.

The working fluid pressurized by the hydraulic power generating mechanism 7 flows through a liquid supply passage 10 and a first liquid passage 14 into a back pressure chamber extending behind the piston 13. The working fluid flows through a second liquid passage 16 formed in the piston guide 15 and a third liquid passage 17 into a front pressure chamber extending in front of the piston 13.

The working fluid returns from the cylinder 12 into the working fluid tank 9 through the first liquid passage 14 and a return passage 11 or through a third liquid passage 17, the second liquid passage 16 and a return passage 11a.

The front end of the piston rod 18 is connected to the working tool 20 by the linkage 19. The working tool 20 has a pair of jaws each having a cutting edge 21, a prying part 22 and a crushing part 23. The pair of jaws open and close for cutting work, prying work and crushing work as the piston rod 18 moves in axial directions.

A hydraulic circuit including the liquid supply passage 10, the return passages 11 and 11a, the first liquid passage 14, the second liquid passage 16 and the third liquid passage 17 formed in the main casing 5 is provided with a spool valve 24 for controlling the flow of the working fluid in the hydraulic circuit. The spool valve 24 is slidable in directions perpendicular to the piston rod 18.

The spool valve 24 has a first land 25 for connecting the first liquid passage 14 to and disconnecting the same from the return passage 11 and a second land 26 for connecting the second liquid passage 16 to and disconnecting the same from the return passage 11a. The first land 25 and the second land 26 are moved to their opening positions or their closing positions to change the flow of the working fluid in the hydraulic circuit.

An upper end part of the spool valve 24 projects outward from the main casing 5. A connecting member 28 has one end connected to the upper end part of the spool valve 24 and the other end provided with a cam follower 29. The cam follower 29 is engaged with a cam plate 31.

Figure 3:
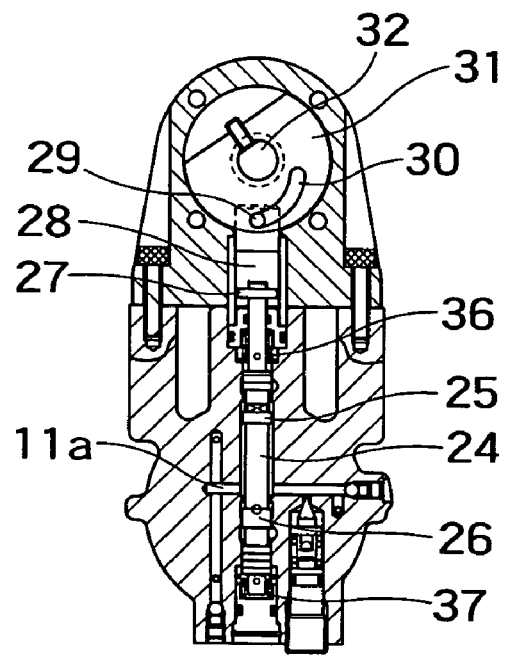
FIG. 3 is a sectional view taken on the line III—III in FIG. 2.

As shown in FIG. 3, the cam plate 31 is provided with a cam groove 30. The cam follower 29 is engaged in the cam groove 30.

The cam plate 31 is put on a handle shaft 32 perpendicular to the spool valve 24. The handle shaft 32 is extended toward the working tool 20 and a grip handle 34 is put on the handle shaft 32. A machine key 33 is inserted between the handle shaft 32 and the grip handle 34 to prevent relative rotation.

The handle shaft 32 is held for rotation in a bearing 35 fitted in a casing 38 joined to the main casing 5. The handle shaft 32 and the cam plate 31 can be turned by turning the grip handle 34 about its axis.

A first spring 36 and a second spring 37 are disposed contiguously with the upper and the lower end, respectively, of the spool valve 24. In a state where the grip handle 34 is not operated, the springs 36 and 37 hold the spool valve 24 automatically at a neutral position.

The operation of the hydraulic tool 1 embodying the present invention will be described.

In FIG. 2, the spool valve is set at an opening position for opening the closed working tool 20 in a state shown in FIG. 2. When the electric motor 3 is started, the cam plate 31 is turned by turning the grip handle 34 so as to push the spool valve 24 down to its lower end position as shown in FIG. 3, and the first land 25 and the second land 26 are moved to their lower positions, respectively. Consequently, the first liquid passage 14 is connected to the return passage 11, and the second liquid passage 16 is connected to the liquid supply passage 10. Thus the first liquid passage 14 serves as a return passage and the second liquid passage 16 serves as a liquid supply passage.

Figure 4:
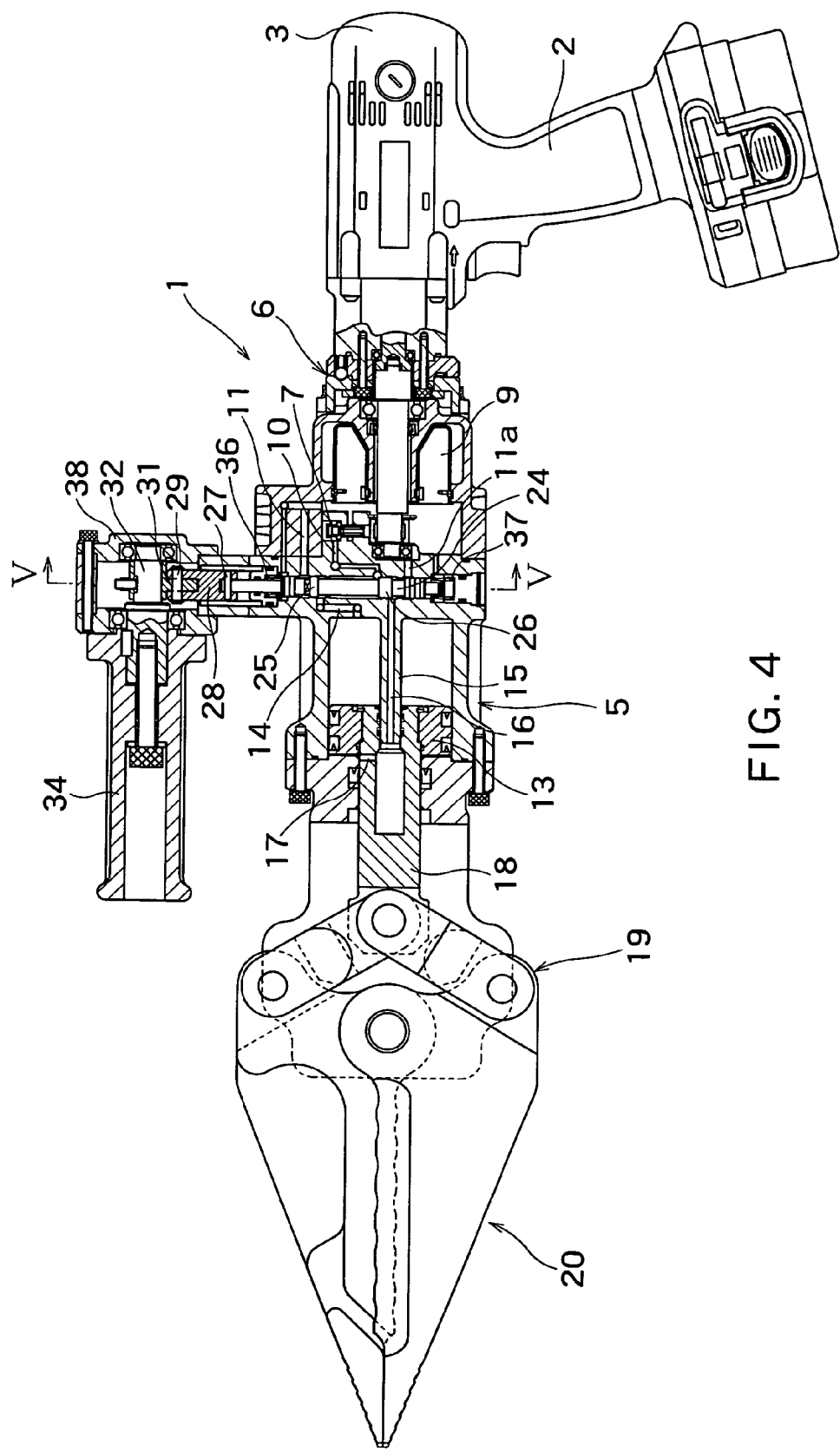
FIG. 4 is a cross-sectional view of the hydraulic tool in the preferred embodiment in a condition for cutting or crushing work.
Figure 6:
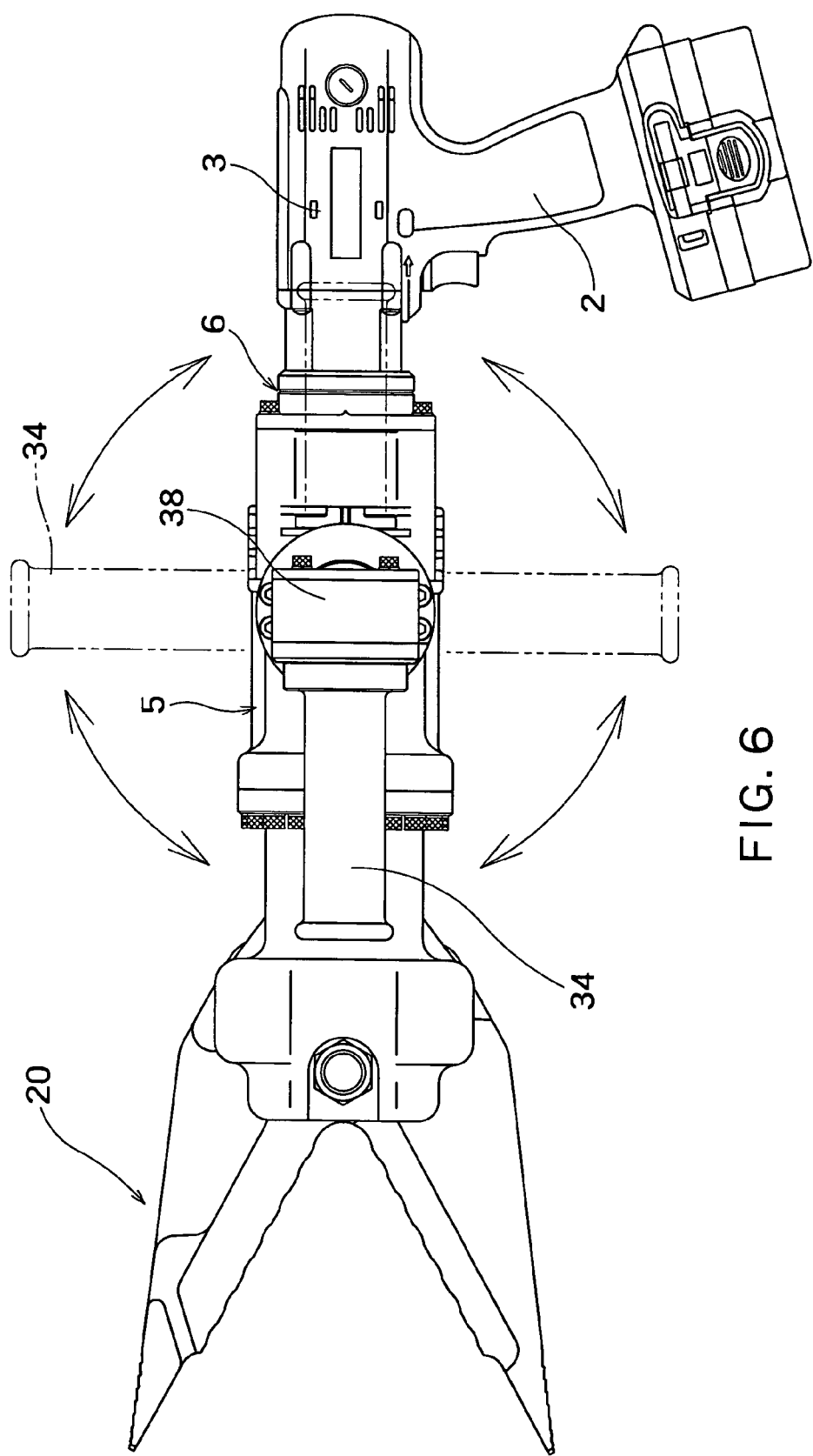
FIG. 6 is a reference view to show the turning motion of a grip handle included in the hydraulic tool in the preferred embodiment.

In a state where the working tool 20 is closed as shown in FIG. 4, the piston 13 is at a front position (a left position in FIG. 4) in the cylinder 12. When the working fluid supplied by the hydraulic power generating mechanism 7 flows through the liquid supply passage 10, the second liquid passage 16 and the third liquid passage 17 into the front pressure chamber in front of the piston 13, the piston 13 is moved backward. Consequently, the linkage 19 opens the working tool 20 as shown in FIG. 2. When the working tool 20 is thus opened, the prying parts 22 function for prying work.

When the grip handle 34 is released for free turning in a state where the working tool 20 is opened as shown in FIG. 2, the spool valve 24 is returned to and held at the neutral position by the resilience of the first spring 36 and the second spring 37. When the spool valve 24 is at the neutral position, the cam follower 29 is at the middle of the cam groove 30. Then, the first liquid passage 14 and the second liquid passage 16 are closed by the first land 25 and the second land 26, respectively. Consequently, the working fluid pressurized by the hydraulic power generating mechanism 7 flows through the liquid supply passage 10 and the return passage 11 into the working fluid tank 9, the piston 13 remains stopped and working tool 20 is kept open.

Description will be made of an operation for closing the open working tool 20 as shown in FIG. 4 to use the cutting edges 21 for cutting work.

Figure 5:
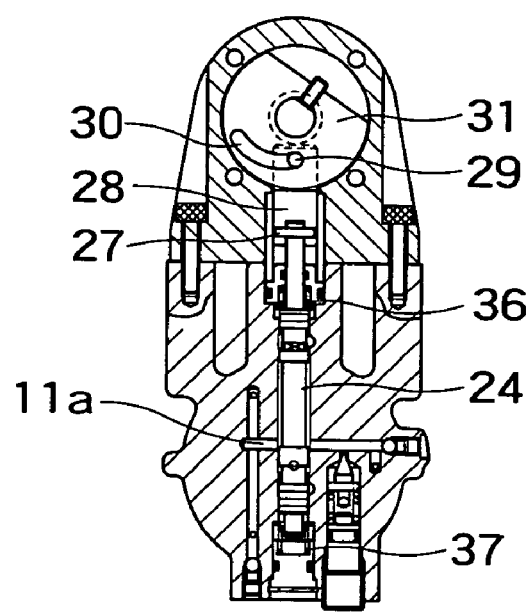
FIG. 5 is a sectional view taken on the line V-V in FIG. 4.

The cam plate 31 is turned by turning the grip handle 34 so as to raise the spool valve 24 to its upper end position as shown in FIG. 5 to use the cutting edges 21 for cutting work.

When the spool valve 24 is set at the upper end position, the first land 25 and the second land 26 are raised. Consequently, the liquid supply passage is connected to the first liquid passage 14, the return passage 11 is closed, and the second liquid passage 16 is connected to the return passage 11a.

Then, the working fluid pressurized by the hydraulic power generating mechanism 7 flows through the liquid supply passage 10 and the first liquid passage 14 into the back pressure chamber behind the piston 13 to move the piston 13 forward in the cylinder 12. Consequently, the piston rod 18 moves forward and drives the linkage 19 to close the working tool 20 as shown in FIG. 4 to achieve cutting work by the cutting edges 21.

When the grip handle 34 is released for free turning in a state where the working tool 20 is closed as shown in FIG. 4, the spool valve 24 is returned to and held at the neutral position by the resilience of the first spring 36 and the second spring 37. Consequently, the first liquid passage 14 and the second liquid passage 16 are closed and the piston 13 remains stopped and the working tool 20 is kept closed as shown in FIG. 4.

Thus, the opening and closing operations of the working tool 20 are controlled simply by turning the grip handle 34. Thus, work for cutting, prying and crushing can be continuously carried out.

The operation of the hydraulic tool 1 for crushing work using the crushing parts 23 is similar to that for cutting work.

When the operator operates the hydraulic tool 1, the operator is able to grip the grip 2 with one hand and to grip the grip handle 34 with the other hand. Therefore, the operator is able to carry out work in a stable working position. The use of both the operator's hands for holding the hydraulic tool 1 is particularly effective in exerting force to an object with the prying part 22 or the crushing part 23 when the hydraulic tool 1 is large and heavy.

Since the electric motor 3 and the main casing 5 are joined by the rotary mechanism 6, the main casing 5 can be turned to an optimum working position by one hand gripping the grip handle 34 with the other hand gripping the grip 2. Consequently, working efficiency can be improved.

Although the hydraulic tool 1 in this embodiment uses a cam mechanism as a motion converting mechanism for converting the turning motion of the grip handle 34 into the axial motion of the spool valve 24, a linkage may be used as the motion converting mechanism.

The casing 38 holding the grip handle 34 is fixed to the main casing 5 in this embodiment. The casing 38 may be connected to the main casing 5 so as to be turnable about the axis of the spool valve 24. When the casing 38 is thus turnable, the grip handle 34 can be turned about the axis of the spool valve 24 to a position where the grip handle 34 can be easily operated.

INDUSTRIAL APPLICABILITY

As apparent from the foregoing description, according to the present invention, one of the operator's hands grips the grip and the other hand holding the grip handle is able to operate the spool valve. Since the hydraulic tool can be stably held by both hands, the hydraulic tool can be surely operated for opening and closing operations even if the hydraulic tool needs to exert a strong force on an object.

The hydraulic tool is able to carry out cutting work, prying work and crushing work continuously.

Since the opening and closing operations of the working tool are controlled by operating the grip handle gripped by the hand not gripping the grip of the electric motor, the main casing connected to the electric motor by the rotary mechanism can be turned relative to the electric motor and the operability of the hydraulic tool can be thereby improved.

The operability of the hydraulic tool can be further improved by supporting the grip handle so as to be turnable about the axis of the spool.

The invention claimed is:

1. A hydraulic tool comprising:
an electric motor having a grip resembling a pistol grip;
a main casing having a back end connected to the electric motor, and internally provided with a working fluid tank containing a working fluid, a hydraulic power generating mechanism driven by the electric motor to pressurize the working fluid contained in the working fluid tank, a cylinder actuator including a piston to be axially moved by the pressurized working fluid and a piston rod connected to the piston, a hydraulic circuit connecting the hydraulic power generating mechanism and the cylinder actuator and having a supply passage for carrying the working fluid into a front pressure chamber on the front side of the piston or a back pressure chamber on the back side of the piston and return passages for carrying the working fluid back into the working fluid tank, and a spool valve placed in the hydraulic circuit to set the hydraulic circuit in a state for supplying the working fluid into either of the front or the back pressure chamber; and
a working tool connected to a front part of the main casing and capable of being operated by the sliding piston rod;
wherein the spool valve is supported so as to be able to slide in directions perpendicular to the piston rod, a cylindrical grip handle to be gripped by one of operator's hands is attached to the outer surface of the main casing so as to extend parallel to the piston rod, the grip handle, when operating, is being turned about its own axis, and the spool valve and the grip handle are interlocked by a motion converting mechanism, the converting mechanism, when operating, is converting a turning motion of the grip handle into a sliding motion of the spool valve.

2. The hydraulic tool according to claim 1, wherein the motion converting mechanism is a cam mechanism.

3. The hydraulic tool according to claim 1, wherein the motion converting mechanism is a linkage.

4. The hydraulic tool according to claim 1, wherein the grip handle can be turned about the axis of the spool valve.

* * * * *